US011809381B2

(12) United States Patent
Kambuj et al.

(10) Patent No.: US 11,809,381 B2
(45) Date of Patent: *Nov. 7, 2023

(54) ACCESSING NETWORK BASED CONTENT ITEMS BY A MOBILE DEVICE WHILE OFFLINE

(71) Applicant: Dropbox, Inc., San Francisco, CA (US)

(72) Inventors: Aakash Kambuj, Seattle, WA (US); Vinod Valloppillil, Berkeley, CA (US); Yufei Guo, San Francisco, CA (US); Rodrigo Gomez Avila, Seattle, WA (US); Calvin Low, Belmont, CA (US); William R. Fraser, Seattle, WA (US); David Zhang, Pacifica, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/846,818

(22) Filed: Jun. 22, 2022

(65) Prior Publication Data

US 2022/0318201 A1    Oct. 6, 2022

Related U.S. Application Data

(63) Continuation of application No. 15/468,414, filed on Mar. 24, 2017, now Pat. No. 11,372,816.

(Continued)

(51) Int. Cl.
*G06F 16/00* (2019.01)
*G06F 16/178* (2019.01)

(52) U.S. Cl.
CPC ................ *G06F 16/178* (2019.01)

(58) Field of Classification Search
None
See application file for complete search history.

(56) References Cited

U.S. PATENT DOCUMENTS

2009/0193107 A1* 7/2009 Srinivasan .............. H04L 67/59
709/223
2011/0307573 A1* 12/2011 Lingafelt ............... G06Q 30/04
713/340

(Continued)

OTHER PUBLICATIONS

Advisory Action from U.S. Appl. No. 15/468,414, dated Jan. 31, 2020, 2 pages.

(Continued)

*Primary Examiner* — Debbie M Le
(74) *Attorney, Agent, or Firm* — Polsinelli PC

(57) ABSTRACT

Disclosed are systems and methods of accessing content items stored at a content management system by a mobile device, when the mobile device is not communicatively coupled to the content management system. The content management system can receive an indication to mark a content item (e.g., folder and the content items associated with the folder) as available to a mobile device when the mobile device is offline. The content management system can mark the content item, and any content items associated with the content item, for offline access by the mobile device and determine a synchronization schedule for the content item(s). The content management system can then initially send to the mobile device, the marked content item(s) in accordance with the synchronization schedule. While offline, the mobile device can make changes to the marked content items. The changes can be synchronized between the mobile device and content management system when the mobile device is online.

20 Claims, 9 Drawing Sheets

Related U.S. Application Data

(60) Provisional application No. 62/441,111, filed on Dec. 30, 2016.

(56) References Cited

U.S. PATENT DOCUMENTS

| | | | |
|---|---|---|---|
| 2013/0138608 A1* | 5/2013 | Smith | G06F 16/27 707/610 |
| 2013/0262392 A1 | 10/2013 | Vibhor et al. | |
| 2013/0297662 A1 | 11/2013 | Sharma et al. | |
| 2014/0330874 A1 | 11/2014 | Novak et al. | |
| 2016/0292179 A1 | 10/2016 | Von Muhlen et al. | |

OTHER PUBLICATIONS

Box Community User Services, "Box for iOS—Can I Sync on My Mobile Device?," Box Inc., Dec. 16, 2014, retrieved from https:community.box.comtSMobileBox-for-iOS-Can-1-Sync-on-My-Mobile-Deviceta-p254 on Mar. 24, 2017, 1 page.

Final Office Action from U.S. Appl. No. 15/468,414, dated Oct. 31, 2019, 26 pages.

Non-Final Office Action from U.S. Appl. No. 15/468,414, dated Sep. 10, 2020, 33 pages.

Notice of Allowance from U.S. Appl. No. 15/468,414, dated Apr. 19, 2022, 8 pages.

\* cited by examiner

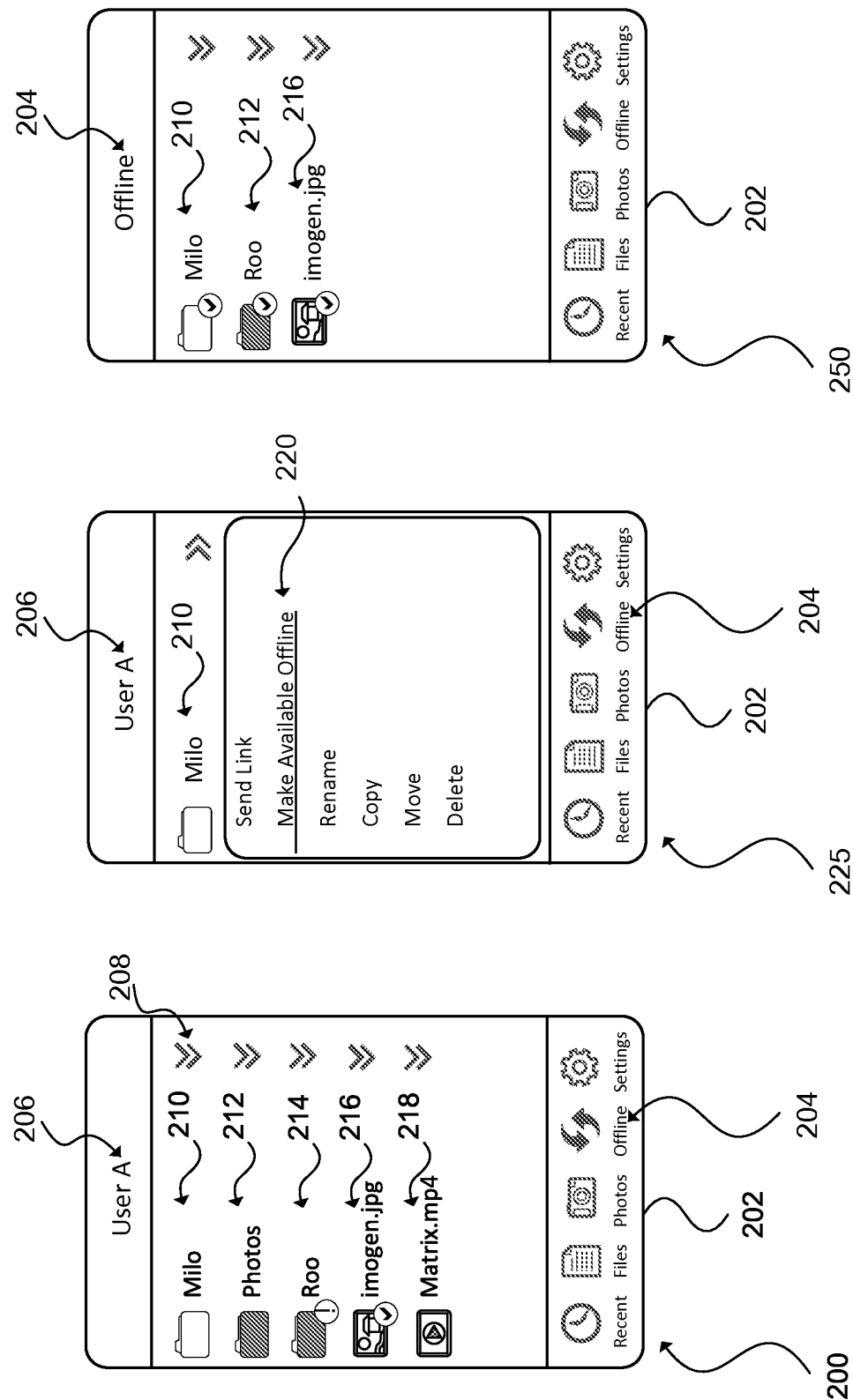

400

```
┌─────────────────────────────────────┐
│ DETERMINE ONE OR MORE CONTENT ITEMS │
│     SHOULD BE AVAILABLE OFFLINE     │
│                 405                 │
└─────────────────────────────────────┘
                   │
                   ▼
┌─────────────────────────────────────┐
│   MARK THE ONE OR MORE CONTENT ITEMS│
│                 410                 │
└─────────────────────────────────────┘
                   │
                   ▼
┌─────────────────────────────────────┐
│   DETERMINE SYNCHRONIZATION SCHEDULE│
│                 415                 │
└─────────────────────────────────────┘
                   │
                   ▼
┌─────────────────────────────────────┐
│  SYNCHRONIZE THE ONE OR MORE CONTENT│
│                ITEMS                │
│                 420                 │
└─────────────────────────────────────┘
```

FIG. 4

ACCESSING NETWORK BASED CONTENT ITEMS BY A MOBILE DEVICE WHILE OFFLINE

CROSS REFERENCE TO RELATED APPLICATIONS

This application is a continuation of U.S. application Ser. No. 15/468,414, filed Mar. 24, 2017, entitled, "ACCESSING NETWORK BASED CONTENT ITEMS BY A MOBILE DEVICE WHILE OFFLINE" and claims the benefit of U.S. provisional application No. 62/441,111, filed on Dec. 30, 2016, entitled, "ACCESSING CLOUD BASED FOLDERS BY A MOBILE DEVICE WHILE OFFLINE," which is expressly incorporated by reference herein in its entirety.

TECHNICAL FIELD

The present technology pertains to content items stored at a content management system and available for access by a mobile device, and more specifically pertains to content items being available for access when the mobile device is not communicatively coupled to the content management system.

BACKGROUND

Content items stored in an online storage account associated with a content management system can be accessed, via a network, by mobile devices through, for example, mobile applications. Users can upload content items, such as pictures, songs, documents, folders, etc., from the mobile device (and other computing devices) to their online storage account and later access the content items while communicatively coupled, via a network, to the content management system. The uploaded content items, unlike on a desktop or laptop computing device, are not automatically stored, locally, on the mobile device.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not, therefore, to be considered to be limiting of its scope, the principles herein are described and explained with additional specificity and detail through the use of the accompanying drawings in which:

FIGS. 2A, 2B, and 2C show an example mobile application for offline content items in accordance with some embodiments

FIG. 4 shows a flow diagram of an example method for initializing offline content items;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for offline access to content items (e.g., folders) by a mobile device (e.g., smartphone, tablet, etc.). A user can store a large quantity of content items at their online storage account associated with a content management system. The user can store these content items from a variety of computing devices, including mobile devices, desktop computers, laptop computers, tablets, etc. The content items can be accessed by a computing device, when communicatively coupled to the content management system, through a variety of ways, such as through a stand-alone application, one or more application plug-ins, a web browser, etc. Different computing devices can have different storage capacities for locally storing content items that reside at the content management system. For example, desktop computers have high storage capacities and can locally store a high quantity of content items, where mobile devices have a low storage capacity (compared to the content management system and desktop computers) and cannot locally store a large quantity of content items.

Accordingly, mobile devices generally access content items stored at the content management system while "online" (e.g., communicatively coupled to the content management system) since the mobile devices do not have the necessary capacity to locally store a large quantity of the content items. In some situations, users may mark specific content items for "offline" access (e.g., not communicatively coupled to the content management system). For example, a user may mark a folder they wish to access over the weekend when not connect to their network (e.g., employer's corporate network, virtual private network, etc.). The folder (as well as all associated content items) can be downloaded from the content management system, and be stored locally on the mobile device so the user can access the folder of content items while not communicatively coupled to the network.

Figure 1:
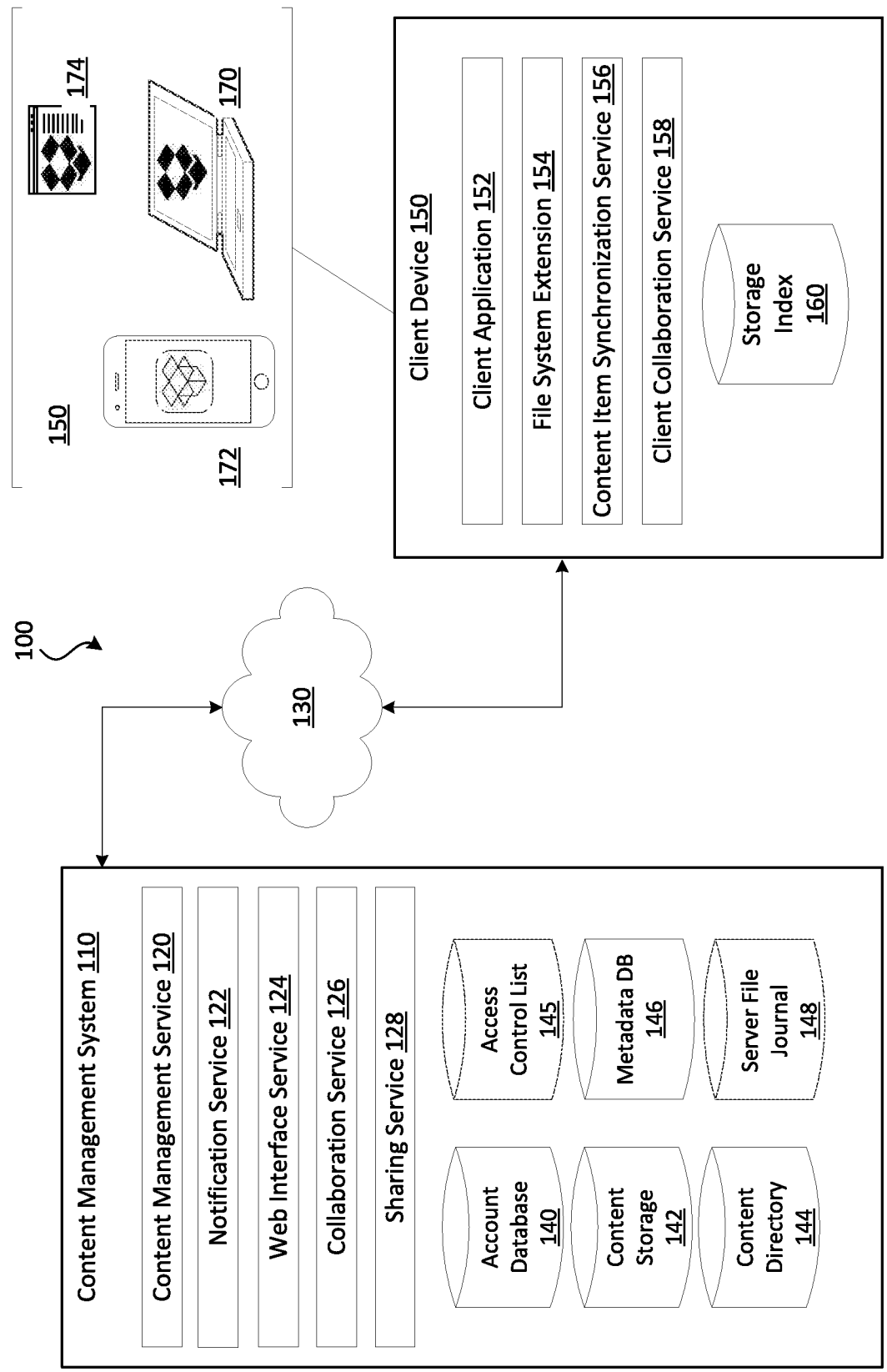
FIG. 1 shows an example configuration of devices and a network in accordance with some embodiments.

In some embodiments the disclosed technology is deployed in the context of a content management system having content item synchronization capabilities and collaboration features, among others. An example of a system configuration 100 is shown in FIG. 1, which includes content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices via a communication network 130 (e.g., the Internet; telephone data networks, including 3G, LTE, etc.; wide area networks; local area network; virtual networks, wireless networks, etc.).

Content management system 110 supports a plurality of accounts. An entity (user, group of users, company, etc.) can create an account with content management system, and account details can be stored in account database 140. Account database 140 can store profile information for registered entities. In some cases, profile information for a registered entity can include a username and/or email address. Account database 140 can include account management information, such as account type (e.g., various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of a group can inherit the permissions. For example, a marketing group can have access to one set of content items while an engineering group can have access to another set of content items. An administrator of a group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 can be combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content management service 120, which includes software or other processor executable instructions for managing the storage of content items including, but not limited to, receiving content items for storage, preparing content items for storage, selecting a storage location for the content item, retrieving content items from storage, etc. In some embodiments, content management service 120 can divide a content item into smaller blocks of data for storage at content storage 142. The location of each data block making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can recognize content item duplicates as such since the deterministic hash function will generally output the same identifier for every copy of the same content item, but will output a different identifier for a different content item. Using this methodology, content management service 120 can output a unique ID for each content item.

Content management service 120 can also designate or record a content path for a content item. The content path can include the name of the content item and/or folder hierarchy associated with the content item. For example, the content path can include a folder or path of folders in which the content item is stored in a local file system on a client device. Content management service 120 can use the content path to present the content items in the appropriate folder hierarchy, such as a tree-like directory structure. While content items are stored in content storage 142 in blocks and may not be stored under a tree like directory structure, such directory structure is a comfortable navigation structure for users. Content management service 120 can define or record a content path for a content item wherein the "root" node of a directory structure can be a namespace for each account. Within the namespace can be a directory structure defined by a user of an account and/or content management service 120. Content directory 144 can store the content path for each content item as part of a content entry.

In some embodiments the namespace can include additional namespaces that appear in the directory structure as if they are stored within the root node. This can occur when an account has access to a shared collection. Shared collections can be assigned their own namespace within content management system 110. While shared collections are actually a root node for the shared collection, they are located subordinate to the user account namespace in the directory structure, and can appear as a folder within a folder for the user account. As addressed above, the directory structure can be a comfortable navigation structure for users, but does not necessarily correlate to storage locations of content items in content storage 142.

While the directory structure in which an account views content items does not necessarily correlate to storage locations at content management system 110, the directory structure can generally correlate to storage locations on client device 150 depending on the file system used by client device 150.

As addressed above, a content entry in content directory 144 can also include the location of each block of data making up a content item. More specifically, the content entry can include content pointers that identify the location in content storage 142 of the data blocks that make up the content item.

In addition to a content path and content pointer, a content entry in content directory 144 can also include a user account identifier that identifies the user account that has access to the content item and/or a group identifier that identifies a group with access to the content item. In some embodiments, multiple user account identifiers can be associated with a single content entry indicating that the content item has shared access by the multiple user accounts. In some embodiments, user account identifiers associated with a single content entry can specify different permissions for the associated content item. In some embodiments, content directory 144 can describe a hierarchical structure of content items associated with a user account, the hierarchical structure being specific to the user account.

Content management service 120 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content management service 120 can also store metadata describing content items, content item types, folders, file path, and/or the relationship of content items to various accounts, collections, or groups in metadata database 146, in association with the unique ID of the content item.

Content management service 120 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content management service can provide the ability to undo operations, by using a content item version control service that tracks changes to content items, different versions of content items (including diverging version trees), and a change history that can be acquired from the server file journal 148. The change history can include a set of changes that, when applied to the original content item version, produces the changed content item version.

Content Item Synchronization

Another feature of content management system 110 is synchronization of content items with at least one client device 150. Client device(s) can take different forms and have different capabilities. For example, client device 170 is a computing device having a local file system accessible by multiple applications executing on the device. Client device 172 is a computing device in which content items may only be accessible to a specific application or by permission given by the specific application, and the content items can be stored in an application specific space and/or in a remote network. Client device 174 is any client device accessing content management system 110 via a web browser and accessing content items via a web interface. While example client devices 170, 172, and 174 are depicted in form factors such as a laptop, mobile device, or web browser, it should be understood that these descriptions do not limit client devices to these form factors. For example, a mobile device, such as client device 172, may have a local file system accessible by multiple applications executing on the device, or client device 172 may access content management system 110 via a web browser. As such, the form factor should not be considered limiting when considering client device 150's capabilities. One or more functions described in this disclosure with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a content item synchronization service 156.

Content item synchronization service 156 can be in communication with content management service 120 to synchronize changes to content items between client device 150 and content management system 110.

Client device 150 can synchronize content with content management system 110 via content synchronization service 156. The synchronization can be platform agnostic. That is, content can be synchronized across multiple client devices of varying types, capabilities, operating systems, etc. Content synchronization service 156 can synchronize any changes (new, deleted, modified, copied, or moved content items) to content items in a designated location of a file system of client device 150.

While content can be synchronized across multiple client devices of varying operating systems, each operating system can have its own challenges in synchronizing between the content management system and the mobile devices (specifically iOS). For example, each application running iOS is siloed into its own private data space and cannot share data with each other. Historically applications could not share data between each other. Instead, applications would provide a copy of the data to the other applications, which in turn saves a copy in its private data share. For example, if a user wants to edit a text document stored in client application 152, a copy of that text document would be sent to the text editor. The user can edit the text document and the text editor would then save a copy it its own private data space. However, the edits would not be sent back to client application 152 and in turn the edits could not be synchronized to the content management system.

Content items can be synchronized from client device 150 to content management system 110, and vice versa. In embodiments in which client device 150 initiates synchronization of content items with content management system 110, a user can manipulate content items directly from the file system of client device 150, while file system extension 156 (which can be integrated with the local file system, or even the operating system kernel) can intercept read, write, copy, move, delete commands relative to content items in the designated location of the file system of client device 150.

When file system extension 154 detects a write, move, copy, or delete command, it can notify content item synchronization service 156, which can synchronize the changes to content management system service 120. In some embodiments, content item synchronization service 156 can perform some functions of content management system service 120 including functions addressed above such as dividing a content item into blocks, hashing the content item to generate a unique identifier, etc. Content synchronization service 156 can index content within client storage index 160 and save the result in storage index 160. Indexing can include creating a unique identifier for each content item. In some embodiments, content synchronization service 156 creates this unique identifier by putting the data of the content item (e.g., excluding the filename and/or other metadata) through a hash function; as addressed above, content management system can use a similar process to provide identifiers to content on content management system 110. Content synchronization service 156 can use storage index 160 to facilitate the synchronization of at least a portion of the content within client storage with content associated with a user account on content management system 110. For example, content synchronization service 156 can compare storage index 160 with content management system 110 and detect differences between content on client storage and content associated with a user account on content management system 110. Content synchronization service 156 can then attempt to reconcile differences by uploading, downloading, modifying, and/or deleting content on client storage as appropriate. Content management service 120 can store the changed or new block for the content item and update server file journal 148, metadata database 146, content directory 144, content storage 142, account database 140, etc., as appropriate.

When synchronizing content from content management system 110 to client device 150, a modification, addition, deletion, and/or move of a content item recorded in server file journal 148 can trigger delivery of a notification to client device 150 using notification service 122. When client device 150 receives the notification of the change to server file journal 148, client device 150 can check storage index 160 to determine if the time stamp of the change occurred since the last synchronization, or determine if the specific change has been synchronized. When client device 150 determines that it is out of synchronization with content management system 110, content item synchronization service 156 can request content item blocks including the changes, and client device 150 can update its local copy of the changed content items. In some embodiments, notification service 122 can query other services or databases of content management system 110, such as server file journal 148, to gain more context for the notification, to determine if a notification can be batched with another notification, or to supplement a notification, etc.

Sometimes client device 150 might not have a network connection available. In this scenario, content item synchronization service 156 can monitor the linked collection for content item changes and queue those changes for later synchronization to content management system 110 when a network connection is available. Similarly, a user can manually start, stop, pause, or resume synchronization with content management system 110.

Content item synchronization service 156 can synchronize all content associated with a particular user account on content management system 110. Alternatively, content item synchronization service 156 can selectively synchronize a portion of the content of the total content associated with the particular user account on content management system 110. Selectively synchronizing only a portion of the content can preserve space on client device 150 and improve performance of client device 150 and content management system 110 by reducing the processing, memory, storage, and network resources that would otherwise be consumed by synchronizing all content.

In some embodiments, content item synchronization service 156 selectively stores a portion of the content associated with the particular user account and stores placeholder content items in client storage for the remainder portion of the content. For example, content item synchronization service 156 can store a placeholder content item that has the same filename, path, extension, metadata, of its respective complete content item on content management system 110, but lacking the data of the complete content item. The placeholder content item can be a few kilobytes or less in size while the respective complete content item might be significantly larger. After client device 150 attempts to access the content item, content item synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing of content via sharing service 128. Accounts of content management system 110 can share content with one another by providing a link to the content. Sharing service 128 can then provide access to the shared content item from any computing device in network communication with content management system 110. However, in some embodiments, a link can be associated with access restrictions enforced by content management system 110. Sharing service 128 can also facilitate indirect sharing of content within content management system 110 by enabling an account to share shared content with at least one additional user account (in addition to the original user account associated with the content item) so that each user account has access to the content item. The additional user account can gain access to the content by accepting the content, which will then be accessible through web interface service 124 or the directory structure associated with the additional user's account on client device 150. The sharing can be performed in a platform agnostic manner. That is, the content can be shared across multiple client devices 150 of varying types, capabilities, operating systems, etc. The content can also be shared across varying types of user accounts.

To share a content item within content management system 110, sharing service 128 can add a user account identifier to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145.

To share content items outside of content management system 110, sharing service 128 may generate a custom network address, such as a uniform resource locator (URL), which can allow any web browser to access the content item or collection in content management system 110 without authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110. Content management system 110 can then use the received content identification data to identify the appropriate content item and return the content item.

In addition to generating the URL, sharing service 128 can also record the URL, or that the URL exists, in access control list database 145. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from within a specified domain, e.g., from within a corporate network domain, or by accounts associated with a specified domain, e.g., accounts associated with a company account (e.g., @acme.com).

In some embodiments, sharing service 128 can also deactivate a generated URL or otherwise unshare a content item. For example, each content entry can also include an active sharing flag indicating whether the content is still shared, and sharing service 128 may only return a requested content item if the active sharing flag is set to 1 or true. Thus, access to a previously shared content item can be restricted by changing the value of the active sharing flag. This can allow a user to restrict access to the shared content item without having to move the content item, delete the generated URL, etc. Likewise, sharing service 128 can reactivate sharing by again changing the value of the active sharing flag to 1 or true. A user can thus easily restore access to the content item without the need to generate a new sharing mechanism, e.g., a new URL.

In some embodiments, content management system 110 can designate a location, such as a URL, for uploading a content item. For example, a first user account can request an upload location from sharing service 128, and provide the upload location to a second user account (or other user in some cases). The second user account or other user can upload a content item to the first user account using the upload location.

Monitoring Interactions with Shared Content Items

In some embodiments, content management system 110 can provide information about user interactions with a shared content item. In some embodiments, content management system 110 can report that a user is currently viewing the shared content item. For example, client collaboration service 158 can request notifications service 122 to send notifications to other client devices having access to the shared content item when any one client device accesses the shared content item. Notifications service 122 can then notify all client devices regarding access to the shared content item by the one client device. In some embodiments, the interaction data can also serve as a proxy for the presence of a user owning and/or operating the one client device.

In some embodiments, content management system 110 can report a history of user interactions with a shared content item. Collaboration service 126 can query data sources such as metadata database 146 and server file journal 148 to determine that a user account has saved the content item, that a user account has yet to access the content item, etc., and disseminate this information using notification service 122 to other user accounts to determine which user accounts have (or have not) interacted with the shared content item.

In some embodiments, collaboration service 126 can facilitate commenting associated with content, even if a content item does not natively support commenting functionality. Such comments can be stored in metadata database 146.

In some embodiments, collaboration service 126 can originate and transmit notifications for users. For example, a first user can mention a second user in a comment and collaboration service 126 can send a notification to the second user that he has been mentioned in the comment. Various other content item events can trigger notifications, including deleting a content item, sharing a content item, etc.

In general, collaboration service 126 can provide a messaging platform whereby users can send and receive instant messages, voice calls, emails, etc.

Collaboration Content Items

Collaboration service 126 can also provide an interactive content item collaboration platform in which users can simultaneously make changes to collaboration content items, provide comments regarding the collaboration content items, manage tasks associated with the collaboration content items, etc. These collaboration content items can be files that user accounts can create and edit using a content item editor, and can contain elements for enabling collaboration. These collaboration elements may include a collaboration identifier, one or more author and/or editor identifiers, collaboration text, collaboration attributes, interaction information, comments, sharing users, etc. The collaboration elements can be stored in a database entity to allow for search and retrieval of the collaboration content items. Multiple user accounts may access, view, edit, and otherwise collaborate on collaboration content items at the same time or at different times. In some embodiments, this can be managed through a web interface that enables two users to work on the same copy of a collaboration content item at the same time.

Collaboration Companion Interface

In some embodiments client collaboration service 158 can provide a native application companion interface for the purpose of displaying information relevant to a content item being presented on client device 150. In some embodiments, a certain content item is accessed by a native application stored and executed on client device 150, where the content item is in a designated location of the file system of client device 150 such that the content item is managed by client application 152, the native application may not provide any native way to display the above addressed collaboration data addressed above. In such embodiments, client collaboration service 158 can detect that a user has opened a content item, and can provide an overlay with additional information for the content item, such as the collaboration data. For example, the additional information can include comments for the content item, a status of the content item, interactions with the content item by other users, etc. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user account. For example, a software package, such as an application running on client device 150, can programmatically make API calls directly to content management system 110 when a user account provides authentication credentials, to read, write, create, delete, share, or otherwise manipulate content.

A user can utilize a user account to view or manipulate content using a web interface generated and served by web interface service 124. For example, the user can navigate in a web browser to a web address associated with the user account provided by content management system 110. Changes or updates to content in content storage 142 made through web interface service 124, such as uploading a new version of a content item, can be propagated back to other client devices associated with the user account. For example, multiple client devices, each with their own client software, can be associated with a single account and content items in the account can be synchronized between each of the multiple client devices.

Client device 150 can connect to content management system 110 on behalf of a user account. A user of the user account can directly interact with client device 150, for example when client device 150 is a desktop or laptop computer, phone, television, internet-of-things device, etc. Alternatively or additionally, client device 150 can act on behalf of the user account without the user having physical access to client device 150, for example when client device 150 is a server.

Some features of client device 150 are enabled by an application installed on client device 150. In some embodiments, the application can include a content management system specific component. For example, the content management system specific component can be a client application 152 (e.g., stand-alone application), one or more application plug-ins, and/or a browser extension. However, the user can also interact with content management system 110 via a third-party application, such as a web browser, word processor, spreadsheet program, presentation program, source code control tool, etc. that resides on client device 150 and is capable of communicating with content management system 110. In various implementations, client application 152 can present a user interface (UI) for a user to interact with content management system 110. For example, the user can interact with the content management system 110 via file system extension 154 integrated with the file system or via a webpage displayed using a web browser application.

In some embodiments, client application 152 can manage and synchronize content for more than one account of content management system 110. In such embodiments, client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While this disclosure presents system 100 with specific components, it will be understood by one skilled in the art, that the architectural configuration of system 100 is simply one possible configuration and that other configurations with more or fewer components are possible. Further, a service can have more or less functionality, even including functionality described as being associated with another service. Moreover, features described in this disclosure with respect to a particular embodiment can be combined with features described with respect to another embodiment.

FIGS. 2A, 2B, and 2C show an example mobile application for offline content items. Referring to FIG. 2A, mobile application interface 200 can be part of mobile application 202 installed on mobile device 172 to interact with content management system 110. User 206 (e.g., User A) of a user account associated with content management system 110 operates mobile application 202 on mobile device 172. Mobile application 202 can communicatively couple with content management system 110 for viewing and editing content items stored at the user account of user 206 (e.g., User A). For example, the user account of user 206 can have folder 210 (e.g., Milo), folder 212 (e.g., Photos), folder 214 (e.g., Roo), image 216 (e.g., imogen.jpg), and movie 218 (e.g., Matrix.mp4). The content items displayed on mobile application 202 can be stored at content management system 110. While communicatively coupled to the content management system (e.g., by a communication network), the mobile device can access the content items stored at the content management system. In some examples, content items can be available "offline" to the mobile device (e.g., while not communicatively coupled to the content management system). For example, image 216 (e.g., imogen.jpg) can be an "offline" content item, as indicated by the "check mark" icon. Folder 214 (e.g., Roo) can be marked as available "offline," but not yet downloaded to the mobile device, as indicated by the "exclamation mark" icon. User 206 can mark (e.g., select) one or more content items to be available offline through menu 208 (as shown in FIG. 2B).

Referring to FIG. 2B, at mobile application interface 225 of mobile application 202, a user can mark a content item as available offline. For example, user 206 (e.g., User A) can select menu 208 of folder 210 (e.g., Milo). The menu can include a "make available offline" 220 option. In response to marking folder 210 (e.g., Milo) as available offline, content management system can transmit (e.g., via a communication network) the marked folder 210 and all of the associated content items (e.g., stored within the folder, including subfolders and its associated content items) to the mobile device.

In some examples, the content management system can first verify one or more criteria before transmitting content items to the mobile device. For example, content management system can compare available storage capacity of the mobile device with the size of the marked content items to be transmitted. In some examples, content management system 110 can determine an available storage capacity on mobile device 172. When the available storage capacity on the mobile device is less than a threshold amount, the marked content items will not be transmitted. In some examples, the content management system can be allocated a predefined amount of storage on the mobile device (e.g., the threshold amount). When the marked content items exceed the predefined amount of storage allocated to the content management system the marked content items will not be transmitted. In some examples, the user can override the threshold amount and the marked content items can be transmitted (e.g., as long as the mobile device has available storage).

In other examples, content management system 110 may only transmit content items when mobile device is communicatively coupled through a WIFI connection. For example, when mobile device 172 is communicatively coupled through a cellular or wireless telephone technology (2G, 3G, LTE, etc.) the content management system will not transmit the marked content items. In some examples, the user can override the criteria and the marked content items can be transmitted when communicatively coupled through a cellular or wireless telephone technology.

Referring to FIG. 2C, at mobile application interface 250 of mobile application 202, a user can select the "offline" tab 204 (as shown in FIG. 2A) for displaying offline content items at the mobile device. For example, mobile device 172 can have locally stored: image 216 (e.g., imogen.jpg), synchronized folder 212 (e.g., Roo), and newly marked folder 210 (e.g., Milo). These content items (and content items within the folders) can be available for access when mobile device 172 is not communicatively coupled to content management system 110. In some examples, associated content items (e.g., content items stored in a folder) can also be available offline without the user marking each individual associated content item.

Figure 3A:
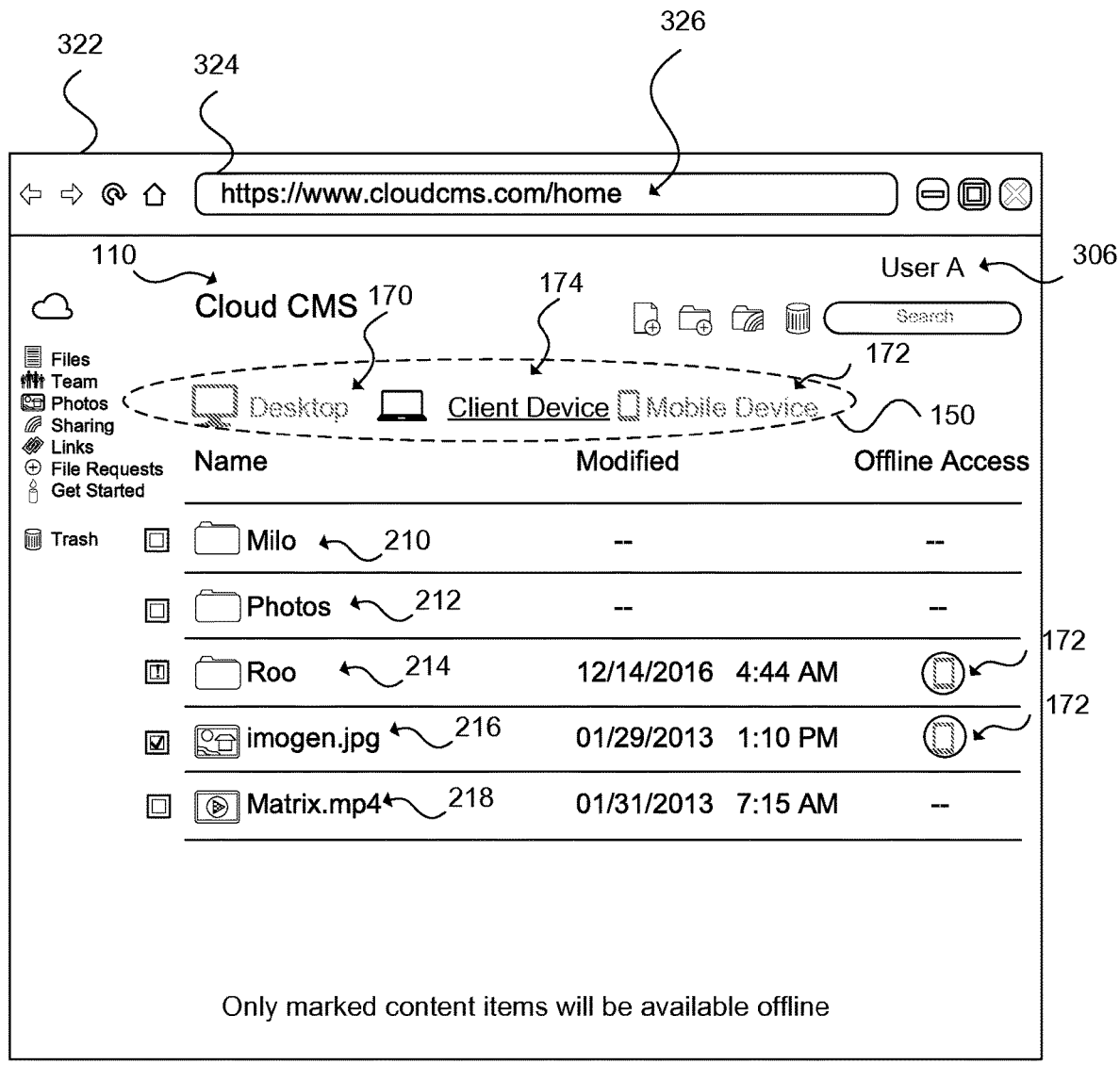
FIGS. 3A and 3B show an example web interface for offline content items in accordance with some embodiments.
Figure 3B:
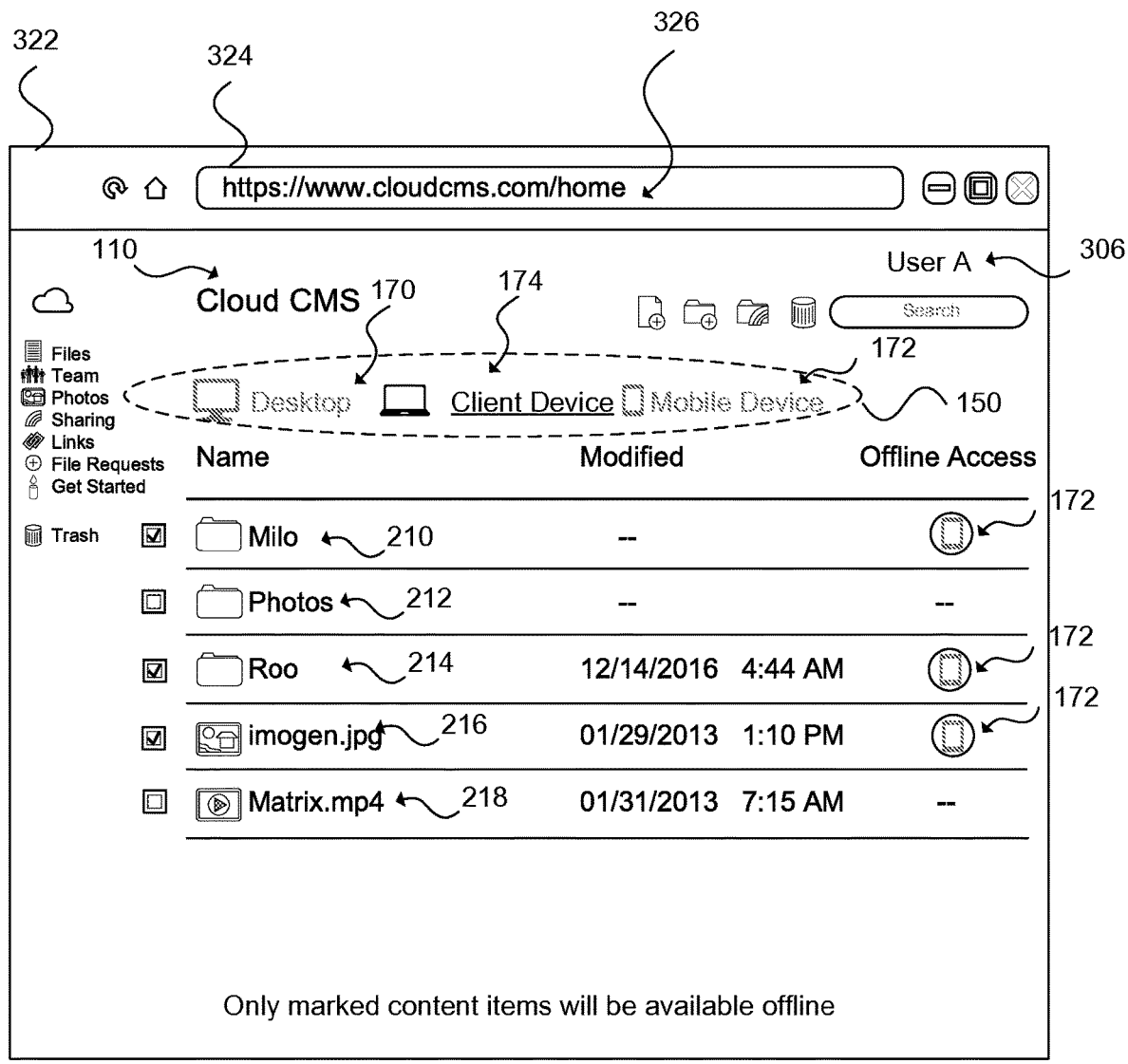

FIGS. 3A and 3B show example web interfaces 300 and 350 for offline content items. Web interface 300 can be rendered and displayed using browsing application 322. Browsing application 322 can be an application operating on a client device that can be used to navigate content items distributed throughout a communication network, such as the Internet. Browsing application 322 can include address bar 324 for displaying web address 326 (e.g., https://www.cloudcms.com/home) toward which user 306 (e.g., User A) can be navigating, browsing, or otherwise interacting. Browsing application 322 can also show one or more client devices 150 associated with user 206. For example, desktop 170, mobile device 172, and client device 174 associated with the user account of user 206. As shown in FIGS. 3A and 3B, content management system 110 is being accessed by client device 174; this is indicated by showing desktop 170 and mobile device 172 as being greyed out.

Referring to FIG. 3A, browsing application 322 can show the content items associated with the user account of user 206. For example, the user account of user 206 of content management system 110 can have folder 210 (e.g., Milo), folder 212 (e.g., Photos), folder 214 (e.g., Roo), image 216 (e.g., imogen.jpg), and movie 218 (e.g., Matrix.mp4). In some examples, content management system 110 can provide indications of content items that have been indicated as available offline and the status of the content items. For example, folder 214 (e.g., Roo) and image 216 (e.g., imogen.jpg) have been marked as offline for mobile device 172 (e.g., stored locally at mobile device 172). For example, image 216 (e.g., imogen.jpg) has been transmitted to mobile device 172, as shown by the "check mark" icon, and folder 214 (e.g., Roo) has been marked for offline access, but not yet been transmitted to mobile device 172, as shown by the "exclamation mark" icon. In some examples, content items can be marked, by user 206, on web interface 300 (or on a client application). For example, a user (or administrator) can select or de-select the check box to the left of the content item. In other examples, the user can right-click a content item to bring up a contextual menu including a mark/unmark option. In other examples, any type of user interface menu can be used to mark/unmark content items. After a content item has been marked available offline via a web interface or client application (that is not executing on the mobile device), the content management system can send an indication (e.g., push notification) that the marked content item is to be synchronized to the mobile device. Upon receiving the indication, content item synchronization service 156 of mobile application 202 can synchronize the marked content to the mobile device. Referring to FIG. 3B, which is subsequent in time to FIG. 2B (e.g., folder 210 being marked available offline), shows folder 210 (e.g., Milo) being marked as available offline and transmitted to mobile device 172. In some examples, marking and unmarking content items can be preemptive (e.g., a user can unmark a content item while that content item is currently being downloaded to the mobile device). In some examples, offline progress of content items can be provided by mobile application 202 (e.g., progress of one or more files, progress of an entire folder, progress of a sub-folder, etc.). In some examples, the progress can be shown in bytes until the download of the content item has been completed. In some examples, the progress can be number of files until the download of the content items has been completed.

The method shown in FIG. 4 is provided by way of example, as there are a variety of ways to carry out the method. Additionally, while the example method is illustrated with a particular order of blocks, those of ordinary skill in the art will appreciate that FIG. 4 and the blocks shown therein can be executed in any order that accomplishes the technical advantages of the present disclosure and can include fewer or more blocks than illustrated.

Each block shown in FIG. 4 represents one or more processes, methods or subroutines, carried out in the example method. The blocks shown in FIG. 4 can be implemented in a system such as system 100 shown in FIG. 1. The flow chart illustrated in FIG. 4 will be described in relation to, and make reference to, at least the elements of system 100 shown in FIG. 1.

FIG. 4 shows an example flow diagram 400 for configuring a mobile device for offline (e.g., local) access of one or more content items stored in a content management system. Flow diagram 400 can begin at block 405. At block 405 a content management system can determine that one or more content items (e.g., folder) should be locally available, at a mobile device, when the mobile device is not communicatively coupled to the content management system (e.g., offline). In some examples, an indication can be sent by the mobile device to the content management system (e.g., after a user marks a content item for offline access, the mobile application on the mobile device can send a notification to the content management system). For example, mobile device 172 can send an indication (e.g., that the user has marked the content item) for local (e.g. offline) access (e.g., when not communicatively coupled to content management system 110) to a folder (e.g., folder 216 Milo). In some examples, the indication can be metadata associated with the content item. In some examples, the indication can include a unique identifier of the content item. In some examples, the indication can be a flag (e.g., variable, Boolean, etc.). Mobile device 172 can have authorized access to a user account of the user with content management system 110, to which one or more content items can be stored. As shown in FIG. 2B, a user can mark a content item (e.g., folder 216 Milo) stored on the content management system to be locally available (e.g., offline) from a mobile application running on the mobile device (e.g., graphical user interface). As shown in FIG. 2C, marked folder (e.g., folder 216 Milo) can be shown with a check mark to indicate to the user that content item (e.g., Milo) is locally (e.g., offline) available to the mobile device. In some examples, the graphical user interface can be a mobile application. In other examples, the graphical user interface can be a web page or client application connected to the content management system.

In other examples, the indication can be sent by an administrator. For example, an administrator can access content management system 110 by client device 174 (e.g., using a web interface, administrative portal, web address, etc.) The administrator can mark (e.g., pin) one or more content items (e.g., files, folders) for local (e.g., offline) availability, along with one or more mobile devices in which the one or more content items are locally available (e.g., while offline from the content management system). For example, an administrator can select one or more manuals (or folders containing one or more manuals) a service technician may need for an on-site job. The manuals can be downloaded to the mobile device of the service technician prior to the on-site job, enabling the service technician access to the manuals for the on-site job. In some examples, removal of the content items from the mobile device can also be performed by the administrator (e.g., the service technician cannot delete the content items).

In other examples, the content management system can determine the mobile device should have offline access to the content items based on historical usage of the content items accessed by the user from the mobile device and/or other client devices. For example, when a user has accessed a specific content item (e.g., image 216 imogen.jpg) multiple times throughout a time period the content management system can automatically mark the content item for offline access (as shown in FIG. 2C) so the user can have local access on the mobile device. In some examples, a content item can be accessed a specific number of times in a single day, a specific number of times throughout a series (or block) of days, or accessed at the end of a week for local access over the weekend. The content management system can also take into consideration when marking content items the available space on the mobile device. For example, when the available storage on the mobile device is below a threshold value (e.g., 20%) the content management system will not automatically mark (and subsequently transmit to the mobile device) the content items.

At block 410, the content management system can mark the one or more content items (and any associated content items) for offline access on the mobile device. For example, content management system 110 can mark the content items by modify settings (e.g., metadata, flag, etc.) of the one or more content items to indicate they should be synchronized with mobile device 172. In some examples, the setting (e.g., indicating the mark) can be stored at metadata database 146. For examples, metadata database 146 can include an entry for the content item and an associated flag (e.g., up-to-date, stale, etc.). In some examples, the settings can be stored in a database, configured to store information (e.g., metadata, flags, etc.) on content items marked for offline availability, communicatively coupled to the content management system. In some examples, a flag can be toggled (e.g., from up-to-date to stale) to indicate a content item should be synchronized to the mobile device. In some examples, the synchronization can occur in accordance with a schedule. In some examples, the synchronization can occur on-demand (e.g., via push notifications) after a content item has been modified. In some examples, the modified settings (e.g., metadata, flag, etc.) can be recursive (e.g., content items and sub-folders within a folder can also be marked).

At block 415, a synchronization schedule is determined or received. In some examples, the synchronization schedule can have a default setting of as soon as a connection is available (e.g., the mobile device communicatively coupled to the content management system). In some examples, the synchronization schedule can be determined by the user (or administrator). For example, the user (or administrator) can determine the synchronization should be scheduled immediately (i.e., send the content items to the mobile device as soon as available). The user (or administrator) can also determine (and transmit to the content management system) a start time (e.g., day:hour:minute, etc.) in which the content items should be synchronized to the mobile device. The user (or administrator) can also determine (and transmit to the content management system) a time period in which the content items should be synchronized to the mobile device and then unsynchronized from the mobile device. For example, a service technician may only need the service manuals for one day while on-site. The start time (e.g., when the content items should be locally added to the mobile device) can be the day before the on-site visit and the stop time (e.g., when the content items should be locally removed from mobile device) can be the day after the on-site visit.

In other examples, the synchronization schedule can be determined based on connectivity of the mobile device. For example, the synchronization can begin when the mobile device is communicatively coupled to the content management system. In some examples, communicatively coupled can be the user of the mobile device initiating mobile application 202 on the mobile device. In other examples, communicatively coupled can be via push notifications sent from the content management system to the mobile device.

Figure 7:
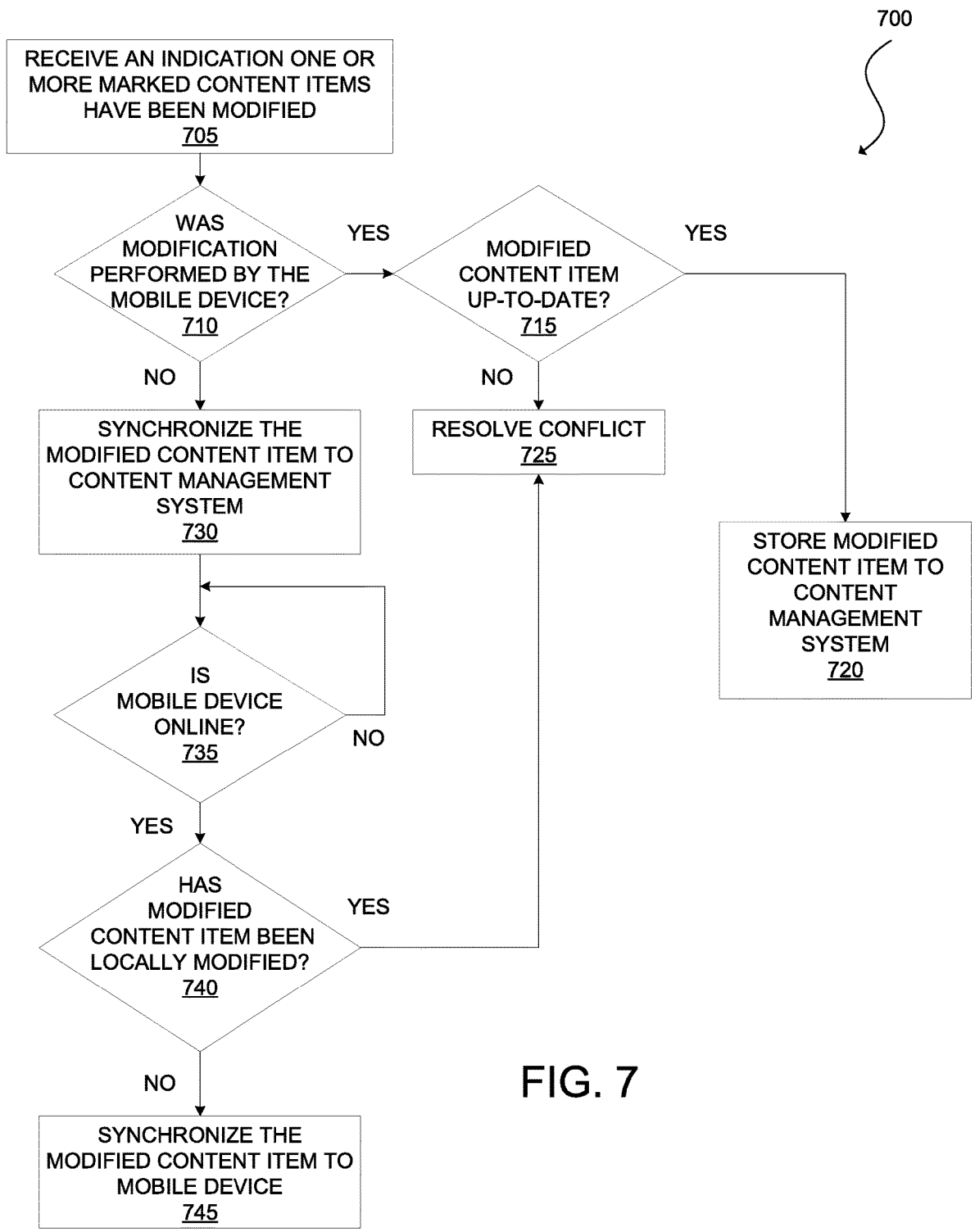
FIG. 7 shows a flow diagram of an example method for two-way synchronization.

At block 420, the one or more content items can be synchronized to the mobile device. For example, content management system 110 can transmit the marked folder (e.g., folder 212 Milo) and the associated content items to mobile device 172. Mobile device 172 can then have local copies of the folder and the associated content items available for access offline (e.g., not connected to content management system 110). In some examples, the synchronization can occur any time a marked content item has been modified, as shown in FIG. 7. In some examples, the synchronization can occur in parallel to the user performing other operations (e.g., using mobile application 202, using other applications or functions of the mobile device, etc.).

Figure 5:
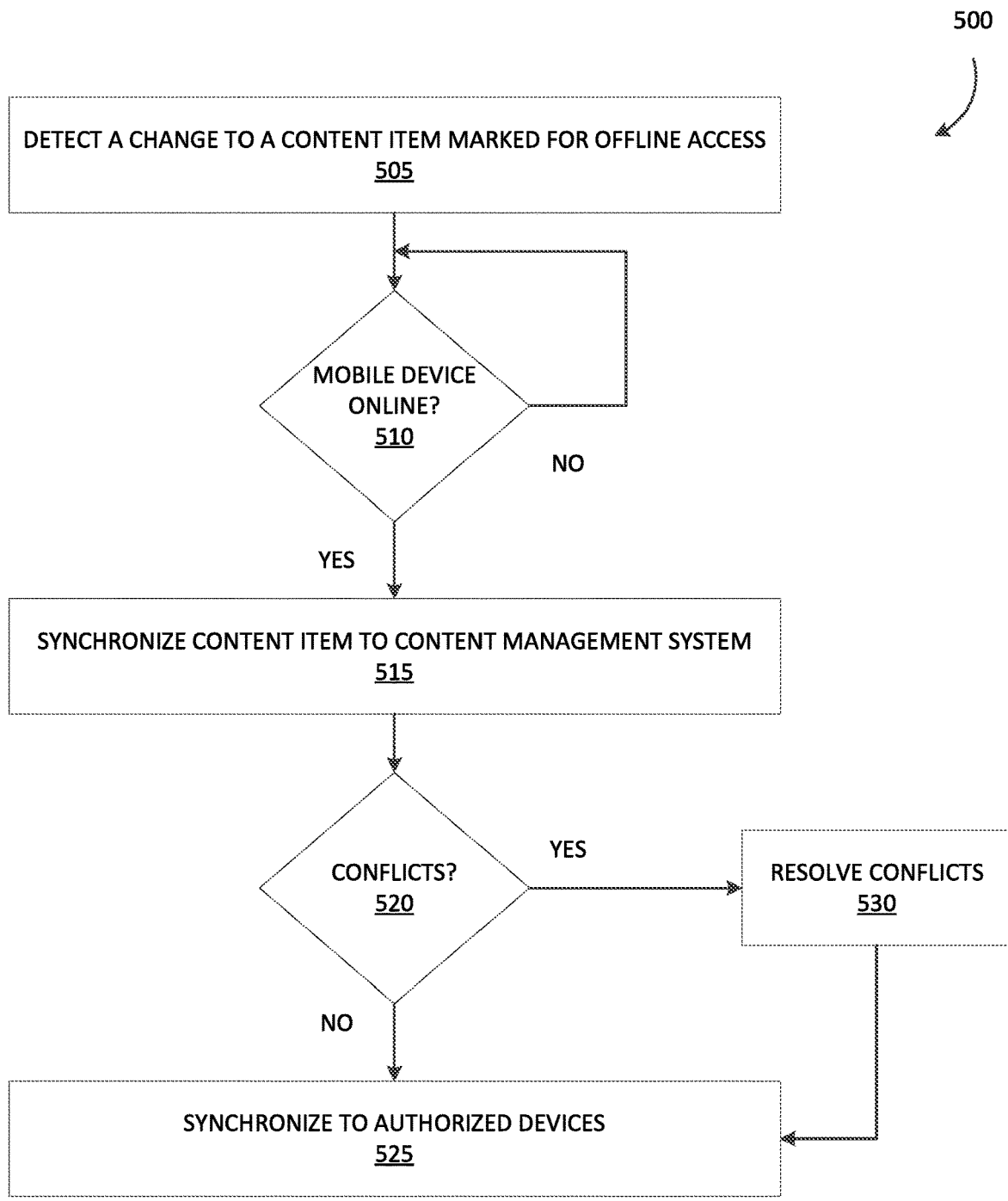
FIG. 5 shows a flow diagram of an example method for synchronizing authorized devices.

The method shown in FIG. 5 is provided by way of example, as there are a variety of ways to carry out the method. Additionally, while the example method is illustrated with a particular order of blocks, those of ordinary skill in the art will appreciate that FIG. 5 and the blocks shown therein can be executed in any order that accomplishes the technical advantages of the present disclosure and can include fewer or more blocks than illustrated.

Each block shown in FIG. 5 represents one or more processes, methods or subroutines, carried out in the example method. The blocks shown in FIG. 5 can be implemented in a system such as system 100 shown in FIG. 1. The flow chart illustrated in FIG. 5 will be described in relation to, and make reference to, at least the elements of system 100 shown in FIG. 1.

FIG. 5 shows an example flow diagram 500 for synchronization of marked content items between a mobile device and a content management system. Flow diagram 500 can begin at block 505. At block 505, a mobile device can detect a change (e.g., modification) to a content item marked for offline access. For example, mobile application 202 on mobile device 172 can detect that a user of the mobile device has changed a content item that was previously marked (e.g., as illustrated in FIG. 4) for offline access and available offline at the mobile device. In some examples, the change can be editing data within a content item (e.g., adding or removing text from a text file, adding or removing content from a marked file, editing an image (image 216 imogen.jpg), etc.). In some examples, the change can be moving content items to a different location on the mobile device file system (e.g., moving a marked file to a different folder, moving a marked folder to a different folder, etc.). In some examples, the change can be adding content items (e.g., adding a file or folder to a marked folder, etc.).

At block 510, a determination on whether the mobile device is online is made. For example, whether the mobile device is currently communicatively coupled to the content management system (via a network connection). When the mobile device is offline, the mobile device can periodically check if it is online and can access the content management system (e.g., telephone data connection, WI-FI connection, etc.). When the mobile device is online (e.g., communicatively coupled to the content management system) the method can proceed to block 515.

At block 515, the mobile device can synchronize the changed content item to the content management system. For example, mobile device 172 can transmit the changed marked content item (e.g., image 216 imogen.jpg) to content management system 110. In some examples, mobile device 172 can transmit the changed marked folder and the associated content items to content management system 110. In some examples, the synchronization can occur any time subsequent to a marked content item being modified.

At block 520, a determination can be made if there is a conflict between the changed marked content item (e.g., marked local copy of the content item on mobile device 172) and the content item stored at the content management system. For example, whether the corresponding version of the changed content item stored on the content management system is stale or up-to-date (e.g., has been contemporaneous modified by another device and not yet synchronized to the mobile device). For example, mobile device 172 can store one or more offline content items (e.g., folder 214 Roo, image 216 imogen.jpg). Mobile device 172 can then go "offline" for a period of time (e.g., not communicatively coupled to content management system 110). While offline, the user can modify the local copies of the one or more marked content items on mobile device 172. Also while mobile device 172 is offline, the corresponding content items can be modified at the content management system by another device 150, resulting in a conflict between the marked local copies of the content item on mobile device 172 and the content item stored at content management system 110. The determination of a conflict can be made using hashing algorithms (e.g., MD5, etc.). When the content item stored on the content management system is up-to-date (e.g., has not been contemporaneously modified), the method can proceed to block 525, where the modified marked content item can be synchronized to authorized devices. When there is a conflict between the marked content item on the mobile device and the content item on the content management system, the method can proceed to block 530.

At block 525, the changed content item can be synchronized to authorized devices. For example, one or more client devices (e.g., desktop 170, client device 174, etc.) can be authorized to access content stored at the user account of user 306 (as shown in FIGS. 3A and 3B).

At block 530, the conflict between changed marked content item on the mobile device and the content item stored on the content management system can be resolved. In some examples, the changed marked content item on the mobile device can be written to the content management system using a different name (e.g., imogen-1.jpg). For example, the changed marked content item can be renamed using the current date or timestamp (e.g., imogen-11052015.jpg). In some examples, when the user of the mobile device is the owner of the content item on the content management system, the content item stored at the content management system can be renamed and the modified local copies of the marked content item can be written using the original name (e.g., imogen.jpg). In other examples, the content management system (e.g., via push notifications through the client application) can ask the user of the mobile device how to address the conflict. For example, overwrite the content item on the content management system, rename, or do not synchronize the local copies of the marked content items on the mobile device.

Figure 6:
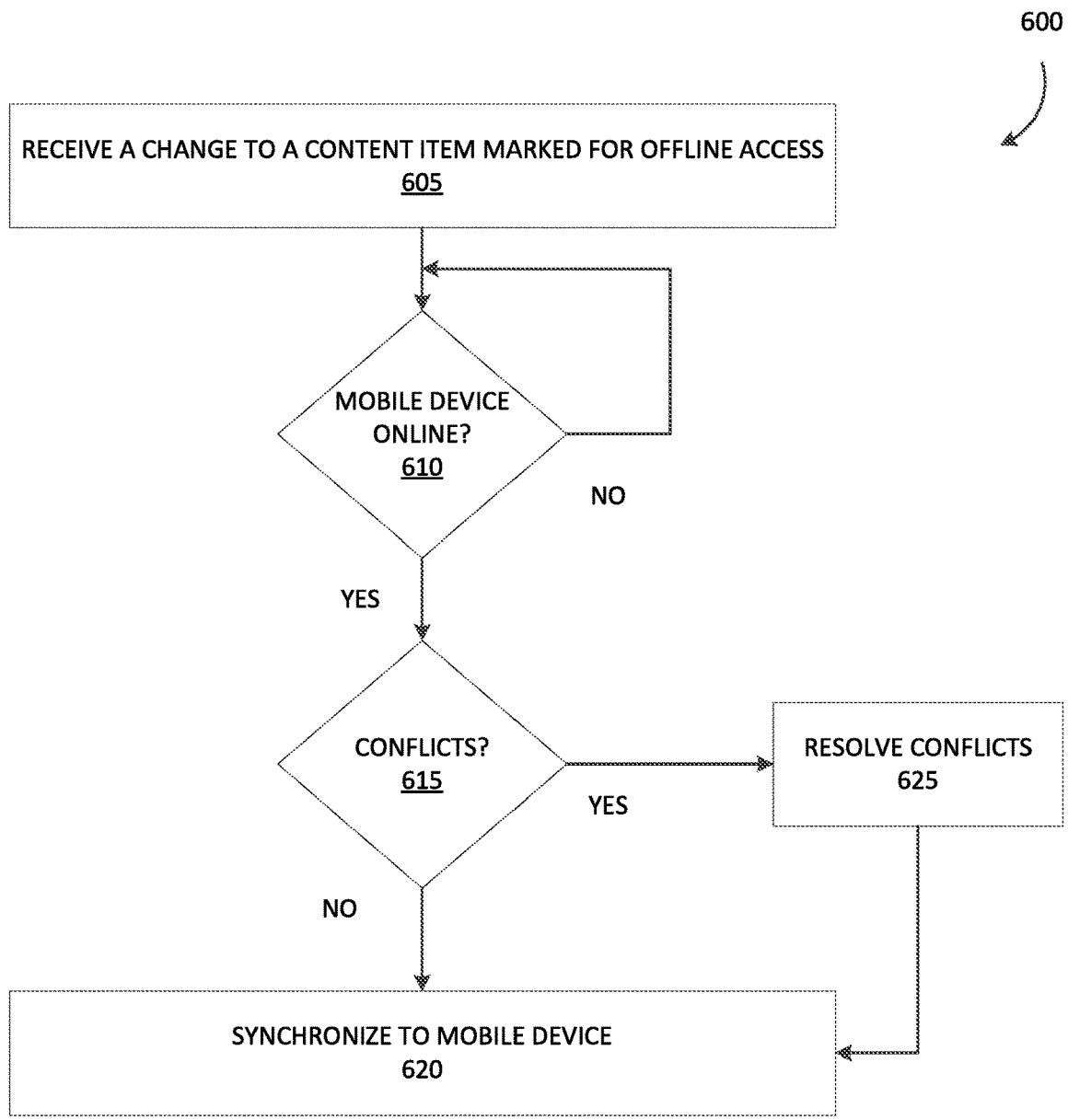
FIG. 6 shows a flow diagram of an example method for synchronizing a mobile device.

The method shown in FIG. 6 is provided by way of example, as there are a variety of ways to carry out the method. Additionally, while the example method is illustrated with a particular order of blocks, those of ordinary skill in the art will appreciate that FIG. 6 and the blocks shown therein can be executed in any order that accomplishes the technical advantages of the present disclosure and can include fewer or more blocks than illustrated.

Each block shown in FIG. 6 represents one or more processes, methods or subroutines, carried out in the example method. The blocks shown in FIG. 6 can be implemented in a system such as system 100 shown in FIG. 1. The flow chart illustrated in FIG. 6 will be described in relation to, and make reference to, at least the elements of system 100 shown in FIG. 1.

FIG. 6 shows an example flow diagram 600 for synchronization of marked content items between a mobile device and a content management system. Flow diagram 600 can begin at block 605. At block 605, the content management system can receive a change to a content item marked for offline access. For example, a client device (e.g., other than at least one mobile device to which the content item was marked offline) can change the content item. In some examples, the change can be editing data within a content item (e.g., adding or removing text from a file, adding or removing content from a marked file, editing an image (image 216 imogen.jpg), etc.). In some examples, the change can be moving content items to a different location on the mobile device file system (e.g., moving a marked file to a different folder, moving a marked folder a different folder, etc.). In some examples, the change can be adding content items (e.g., adding a file or folder to a marked folder, etc.).

At block 610, a determination on whether the mobile device is online is made. For example, whether the mobile device is currently communicatively coupled to the content management system (via a network connection). When the mobile device is offline, the content management system can periodically check if the mobile device is online (e.g., telephone data connection, WI-FI connection, etc.). In some examples, the content management system can receive a notification from the mobile device that it has come online. When the mobile device is online (e.g., communicatively coupled to the content management system) the method can proceed to block 615.

At block 615, the content management system can determine whether there is a conflict between the changed marked content item from the client device and the corresponding content item stored at the content management system. For example, the content management system can determine whether corresponding version of the modified content item stored on the content management system is stale or up-to-date (e.g., has been contemporaneous modified by another device and not yet synchronized to the mobile device). For example, mobile device 172 can store one or more offline content items (e.g., folder 214 Roo, image 216 imogen.jpg). Mobile device 172 can then go "offline" for a period of time (e.g., not communicatively coupled to content management system 110). While offline, the user can modify the local copies of the one or more marked content items on mobile device 172. Also, while mobile device 172 is offline, the corresponding content items can be modified at the content management system by another device 150, resulting in a conflict between the marked local copies of the content item on mobile device 172 and the content item stored at content management system 110. The determination can be made using hashing algorithms (e.g., MD5, etc.). When the content item stored on the content management system is up-to-date (e.g., has not been contemporaneously modified), the method can proceed to block 620, where the modified marked content item can be synchronized to the mobile device where the content item has been marked offline (e.g., mobile device 172). When there is a conflict between the changed content item sent from the client device and the content item stored on the content management system, the method can proceed to block 625.

At block 625, the conflict between changed marked content item on the mobile device and the content item stored on the content management system can be resolved. In some examples, the changed marked content item on the mobile device can be written to the content management system using a different name (e.g., imogen-1.jpg). For example, the changed marked content item can be renamed using the current date or timestamp (e.g., imogen-11052015.jpg). In some examples, when the user of the mobile device is the owner of the content item on the content management system, the content item stored at the content management system can be renamed and the modified local copies of the marked content item can be written using the original name (e.g., imogen.jpg). In other examples, the content management system (e.g., via push notifications through the client application) can ask the user of the mobile device how to address the conflict. For example, overwrite the content item on the content management system, rename, or do not synchronize the local copies of the marked content items on the mobile device.

The method shown in FIG. 7 is provided by way of example, as there are a variety of ways to carry out the method. Additionally, while the example method is illustrated with a particular order of blocks, those of ordinary skill in the art will appreciate that FIG. 7 and the blocks shown therein can be executed in any order that accomplishes the technical advantages of the present disclosure and can include fewer or more blocks than illustrated.

Each block shown in FIG. 7 represents one or more processes, methods or subroutines, carried out in the example method. The blocks shown in FIG. 7 can be implemented in a system such as system 100 shown in FIG. 1. The flow chart illustrated in FIG. 7 will be described in relation to, and make reference to, at least the elements of system 100 shown in FIG. 1.

FIG. 7 shows an example flow diagram 700 for two-way synchronization of marked content items between a mobile device and a content management system. Flow diagram 700 can begin at block 705. At block 705, the content management system can receive an indication a marked content item (or content items associated with the marked content item) has been modified. For example, a file within a marked folder has been edited, removed, added, etc.

At block 710, a determination is made as to how the modification the marked content item was performed (e.g., what user, device, and/or type of access (e.g., client application, web interface, etc.) performed the modification). When the marked content item was modified by the mobile device to which the content was marked (e.g., local to the mobile device), the method can proceed to block 715. When the marked content was modified by a device to which the content was not marked (or in any other fashion), the method can proceed to block 730.

At block 715, the content management system can determine whether corresponding version of the modified content item (e.g., from the indication) stored on the content management system is stale or up-to-date (e.g., has been contemporaneous modified by another device and not yet synchronized to the mobile device). For example, mobile device 172 can store one or more offline content items (e.g., folder 214 Roo, image 216 imogen.jpg). Mobile device 172 can then go "offline" for a period of time (e.g., not communicatively coupled to content management system 110). While offline, the user can modify the local copies of the one or more marked content items on mobile device 172. At a contemporaneous time, the corresponding content items can be modified at the content management system by another device 150, resulting in a conflict between the marked local copies of the content item on mobile device 172 and the content item stored at content management system 110. The determination can be made using hashing algorithms (e.g., MD5, etc.). When the content item stored on the content management system is up-to-date (e.g., has not been contemporaneously modified), the method can proceed to block 720, where the modified marked content can be stored at the content management system. When the content item stored on the content management system is stale (e.g., has been contemporaneously modified), the method can proceed to block 725.

At block 725, the conflict between the local copies of the marked content item on the mobile device and the content item stored on the content management system can be resolved. In some examples, the modified local copies of the marked content item can be written to the content management system using a different name (imogen-1.txt). For examples, the changed marked content item can be renamed using the current date or timestamp (e.g., imogen-11052015.jpg). In some examples, when the user of the mobile device is the owner of the content item on the content management system, the content item stored at the content management system can be renamed and the modified local copies of the marked content item can be written using the original name (e.g., imogen.txt). In other examples, the content management system (e.g., via push notifications through the client application) can ask the user of the mobile device how to address the conflict. For example, overwrite the content item on the content management system, rename, or do not synchronize the local copies of the marked content items on the mobile device.

At block 730, the modification of the marked content item (by a client device, not the mobile device) can be synchronized to the content management system. For example, the synchronization service 156 of the client application running at the client device can synchronize the marked content item to content storage 142 of the content management system. In some examples, the content item on the content management system can be overwritten by the modified marked content item and a "stale" flag of the content items set. When the stale flag is set, the content management system can queue the content items for synchronization to the mobile device. In other embodiments, a conflict check (similar to block 725) can be performed before the modified marked content item is written to the content management system.

At block 735, the content management system can determine whether the mobile device is online. When the mobile device is offline, the content management system can periodically check if the mobile device is online (e.g., at predetermined intervals). In some embodiments, the content management system can send push notifications to the mobile device (e.g., notify the mobile device to come online, open client application, etc.). When the mobile device is online (e.g., communicatively coupled to the content management system) the method can proceed to block 740.

At block 740, a determination can be made as to whether the modified marked content item has also been contemporaneously locally modified at the mobile device (e.g., while offline). For example, while the mobile device was offline, the user has modified the same content item that was also modified by the client device and that the content management system is currently synchronizing (e.g., at block 730). When the local copies of the marked content items on the mobile device have not been modified, the content items can be synchronized to the mobile device (e.g., by synchronization service 156 running on mobile application 202) and the stale flag and be reset to up-to-date at the content management system, at block 745. When the local copies of the marked content item on the mobile device have been locally modified, the method can proceed to block 725 to remedy the conflict.

Figure 8:
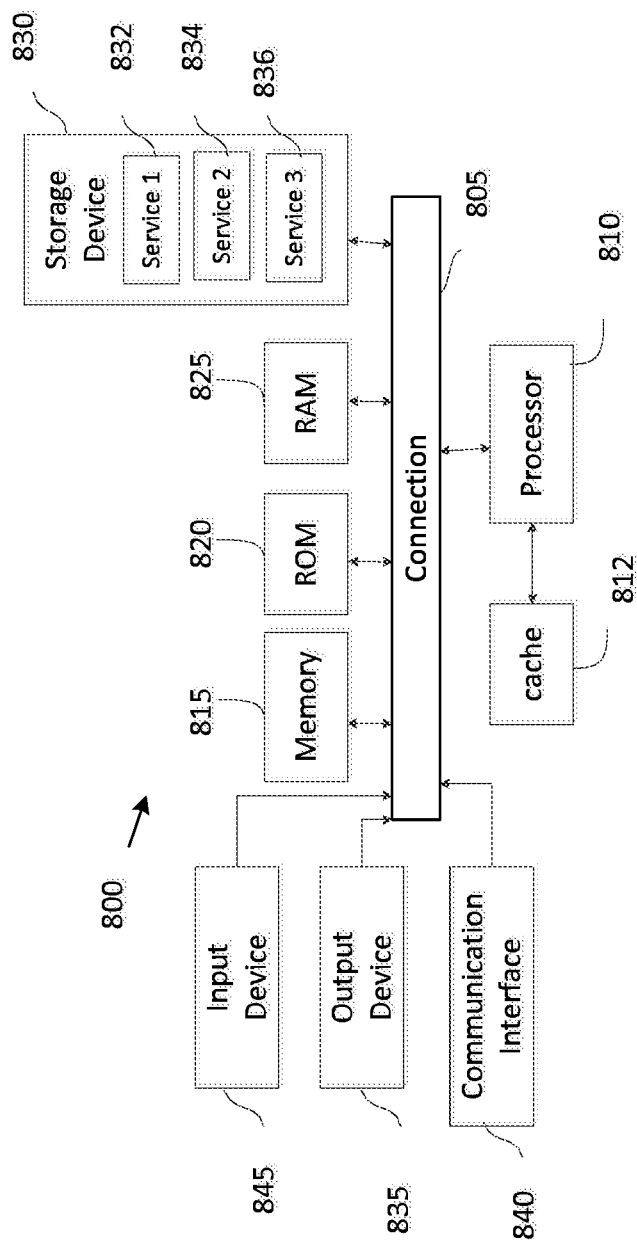
FIG. 8 shows an example of a system for implementing certain aspects of the present technology.

FIG. 8 shows an example of computing system 800 in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments computing system 800 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read only memory (ROM) and random access memory (RAM) to processor 810. Computing system 800 can include a cache of high-speed memory connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A content management system comprising:
   at least one processor; and
   at least one memory storing instructions that, when executed by the at least one processor, cause the at least one processor to:
   access historical usage information of a content item associated with a user account within the content management system;
   upon a determination by the content management system that an amount of historical usage of the content item is met, mark, by the content management system, the content item for offline access by a first client device associated with the user account;
   provide, to the first client device, the content item marked for offline access for local storage and access on the first client device;
   receive, from the first client device, an indication of a user interaction with an icon corresponding to the content item;
   unmark the content item for offline access at the first client device based on receiving the indication of the user interaction; and
   cause the first client device to remove the content item from the local storage of the first client device.

2. The content management system of claim 1, the at least one memory storing instructions that, when executed by the at least one processor, cause the at least one processor to:
   determine available storage is below a threshold amount on the first client device; and
   based on the determined available storage being below the threshold amount, unmark a second content item previously marked for offline use.

3. The content management system of claim 1, the at least one memory storing instructions that, when executed by the at least one processor, cause the at least one processor to:
   determine available storage is below a threshold amount on the first client device;
   receive an override command from the first client device; and
   transmit the content item, wherein the first client device has available storage.

4. The content management system of claim 1, the at least one memory storing instructions that, when executed by the at least one processor, cause the at least one processor to:
   upon a second determination by the content management system that a second amount of historical usage of a second content item is met, mark, by the content management system, the second content item for offline access by a second client device associated with the user account; and
   cause the first client device to display an indication that the second content item has offline access at the second client device based on confirmation from the content management system.

5. The content management system of claim 1, wherein marking the content item is based on the indication received by the content management system to mark the content item for offline access, wherein the indication comprises metadata, a unique identifier, a Boolean flag, or a variable flag associated with the content item.

6. The content management system of claim 1, the at least one memory storing instructions that, when executed by the at least one processor, cause the at least one processor to:
   receive a second indication that the content item has been marked available offline via a web interface or client application that is not executing on the first client device and associated with the user account; and
   send a push notification that the content item is to be synchronized to the first client device, wherein a content item synchronization service of a mobile application synchronizes the content item to the first client device.

7. The content management system of claim 1, wherein the at least one memory storing instructions that, when executed by the at least one processor, cause the at least one processor to:
   receive a second indication that the content item has been marked available offline for the first client device and a second client device via a web interface or client application associated with an administrator user account;
   send a first push notification that the content item is to be synchronized to the first client device, wherein a content item synchronization service of a first client application synchronizes the content item to the first client device; and
   send a second push notification that the content item is to be synchronized to the second client device, wherein a second content item synchronization service of a second client application synchronizes the content item to the second client device.

8. The content management system of claim 1, the at least one memory storing instructions that, when executed by the at least one processor, cause the at least one processor to:
   determine, when the first client device is online after being offline, whether there is a conflict between a change made to the content item at the content management system while the first client device was offline and a version of the content item stored on the first client device; and
   in response to determining that there is a resolvable conflict, resolve the resolvable conflict between the change to the content item and the content item stored at the first client device.

9. The content management system of claim 1, wherein the marking indicates that the content item is synchronized with the first client device and the unmarking indicates that the content item is to be unsynchronized with the first client device, wherein providing the content item includes synchronized the content item with the first client device.

10. A computer-implemented method comprising:
- accessing historical usage information of a content item associated with a user account within a content management system;
- upon a determination by the content management system that an amount of historical usage of the content item is met, marking, by the content management system, the content item for offline access by a first client device associated with the user account;
- providing, to the first client device, the content item marked for offline access for local storage and access on the first client device;
- receiving, from the first client device, an indication of a user interaction with an icon corresponding to the content item;
- unmarking the content item for offline access at the first client device based on receiving the indication of the user interaction; and
- causing the first client device to remove the content item from the local storage of the first client device.

11. The computer-implemented method of claim 10 further comprising:
- determining available storage is below a threshold amount on the first client device; and
- based on the determined available storage being below the threshold amount, unmarking a second content item previously marked for offline use.

12. The computer-implemented method of claim 10 further comprising:
- determining available storage is below a threshold amount on the first client device;
- receiving an override command from the first client device; and
  - transmitting the content item, wherein the first client device has available storage.

13. The computer-implemented method of claim 10 further comprising:
- upon a second determination by the content management system that a second amount of historical usage of a second content item is met, marking, by the content management system, the second content item for offline access by a second client device associated with the user account; and
- causing the first client device to display an indication that the second content item has offline access at the second client device based on confirmation from the content management system.

14. The computer-implemented method of claim 10, wherein marking the content item is based on the indication received by the content management system to mark the content item for offline access, wherein the indication comprises metadata, a unique identifier, a Boolean flag, or a variable flag associated with the content item.

15. The computer-implemented method of claim 10, further comprising:
- receiving a second indication that the content item has been marked available offline via a web interface or client application that is not executing on the first client device and associated with the user account; and
- sending a push notification that the content item is to be synchronized to the first client device, wherein a content item synchronization service of a mobile application synchronizes the content item to the first client device.

16. The computer-implemented method of claim 10 further comprising:
- receiving a second indication that the content item has been marked available offline for the first client device and a second client device via a web interface or client application associated with an administrator user account;
- sending a first push notification that the content item is to be synchronized to the first client device, wherein a content item synchronization service of a first client application synchronizes the content item to the first client device; and
- sending a second push notification that the content item is to be synchronized to the second client device, wherein a second content item synchronization service of a second client application synchronizes the content item to the second client device.

17. The computer-implemented method of claim 11 further comprising:
- determining, when the first client device is online after being offline, whether there is a conflict between a change made to the content item at the content management system while the first client device was offline and a version of the content item stored on the first client device; and
  - in response to determining that there is a resolvable conflict, resolving the resolvable conflict between the change to the content item and the content item stored at the first client device.

18. The computer-implemented method of claim 11, wherein the marking indicates that the content item is synchronized with the first client device and the unmarking indicates that the content item is to be unsynchronized with the first client device, wherein providing the content item includes synchronized the content item with the first client device.

19. A non-transitory computer readable medium including instructions stored thereon, the instructions, when executed by a computing system being effective to cause the computing system to:
- access historical usage information of a content item associated with a user account within a content management system;
- upon a determination by the content management system that an amount of historical usage of the content item is met, mark, by the content management system, the content item for offline access by a first client device associated with the user account;
- provide, to the first client device, the content item marked for offline access for local storage and access on the first client device;
- receive, from the first client device, an indication of a user interaction with an icon corresponding to the content item;
- unmark the content item for offline access at the first client device based on receiving the indication of the user interaction; and
- cause the first client device to remove the content item from the local storage of the first client device.

20. The non-transitory computer readable medium of claim 19, wherein the instructions cause the computing system to:
- determine available storage is below a threshold amount on the first client device; and
- based on the determined available storage being below the threshold amount, unmark a second content item previously marked for offline use.

* * * * *